(12) United States Patent
Gruber et al.

(10) Patent No.: US 6,185,802 B1
(45) Date of Patent: Feb. 13, 2001

(54) MULTIPLE CLAMPING DEVICE FOR WORK PIECES ON A CARRIER

(75) Inventors: Karl-Heinz Gruber, Rudersberg; Bernhard Albeck, Lorch-Waldhausen, both of (DE)

(73) Assignee: Albeck GmbH, Waiblingen-Nuestadt (DE)

( * ) Notice: Under 35 U.S.C. 154(b), the term of this patent shall be extended for 0 days.

(21) Appl. No.: 09/379,447

(22) Filed: Aug. 23, 1999

(30) Foreign Application Priority Data

Sep. 8, 1998 (DE) ............................................... 198 40 942

(51) Int. Cl.$^7$ ................. B23Q 5/22; B23C 9/00
(52) U.S. Cl. .......................... 29/38 R; 29/33 P; 29/38 B; 29/38 C; 269/57; 269/900; 409/219; 409/224; 451/403; 451/414
(58) Field of Search .................................. 409/219, 221, 409/224, 276, 277, 222, 223, 225; 29/33 P, 38 R, 37 R, 38 A, 38 B, 38 C; 451/403, 414; 269/72, 57, 900, 63

(56) References Cited

U.S. PATENT DOCUMENTS

| | | | |
|---|---|---|---|
| 4,422,265 | * 12/1983 | Branston | 29/38 R |
| 4,614,469 | * 9/1986 | Beere et al. | 409/219 |
| 4,974,304 | * 12/1990 | Hirsiger | 29/38 C |
| 5,212,857 | * 5/1993 | McMurtry | 29/38 C |
| 5,243,745 | * 9/1993 | Varnav | 29/33 P |
| 5,421,072 | * 6/1995 | Kuban | 29/38 A |

FOREIGN PATENT DOCUMENTS

| | | | |
|---|---|---|---|
| 35 05 138 C2 | 5/1987 | (DE) . | |
| 288123 | * 3/1991 | (DE) | 409/221 |
| 93 07 196 U | 9/1994 | (DE) . | |
| 115491 | * 9/1979 | (JP) | 409/219 |

OTHER PUBLICATIONS

"Keys to Machining Center Palletization" pp 61–64 Modern Machine Shop Copy in 409/219, Mar. 1982.*

* cited by examiner

Primary Examiner—William Briggs
(74) Attorney, Agent, or Firm—Frishauf, Holtz, Goodman, Langer & Chick P.C.

(57) ABSTRACT

An elongated and cross-section polygonal work piece carrier (1) has at least two clamping surfaces (2) extending parallel to its longitudinal axis (3). It is retained in bearing (5, 9) at least at one end, to be rotatable about its longitudinal axis over 360°. Each of the clamping surfaces (2) is supplied with at least two rotatable work piece holding tables (11) located in a row adjacent each other. The holding tables (11) are coupled by gears (25, 26, 33) with each other and with a common drive gear (35) in such a manner that all tables, in dependence on the rotation of the work piece carrier (1) about its longitudinal axis (3), will rotate over its respective rotation axis (12) about a predetermined angle, depending on the angle of rotation of the work piece carrier; an interrogation device is provided to interrogate whether all rotated tables are in predetermined, locked angular positions.

20 Claims, 6 Drawing Sheets

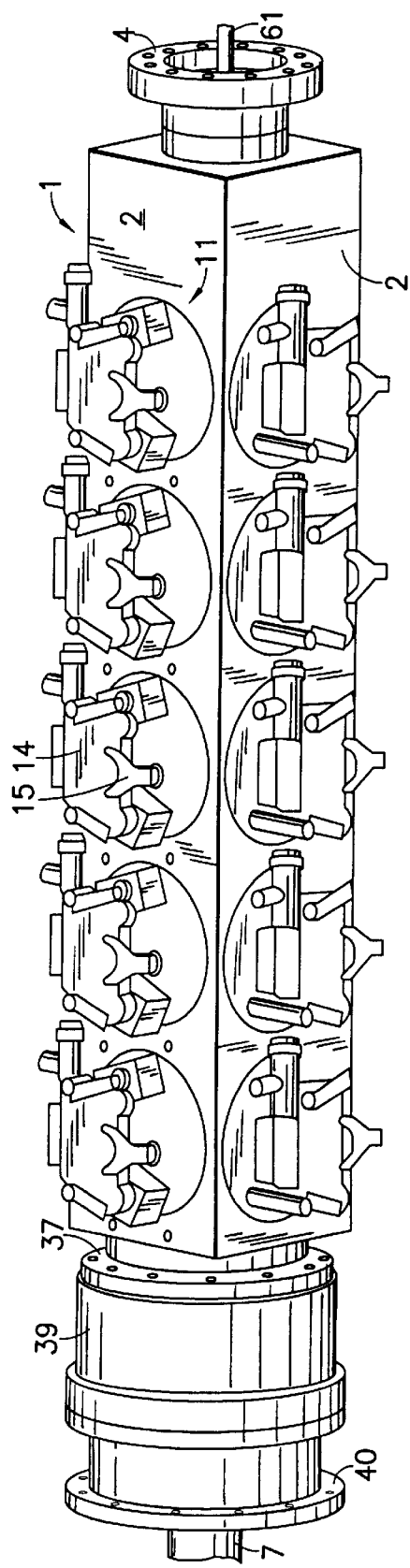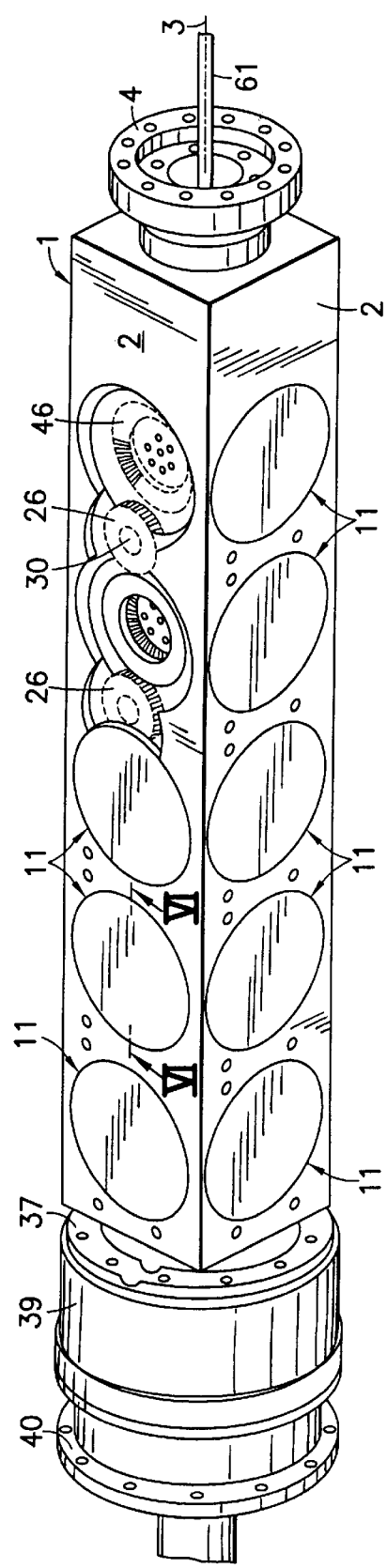

US 6,185,802 B1

MULTIPLE CLAMPING DEVICE FOR WORK PIECES ON A CARRIER

FIELD OF THE INVENTION

The present invention relates to a multiple clamping device to clamp work pieces, particularly work pieces which are to be worked on at multiple sides thereof on a longitudinal work piece carrier which, customarily, is polygonal in cross-section. Such a work piece carrier carries at least two clamping surface extending parallel to its longitudinal axis. The elongated work piece carrier is rotatable about its longitudinal axis, being secured to fixed bearing arrangements, for example on a frame or other support.

BACKGROUND OF THE INVENTION

It is of importance to increase the efficiency of operations on multiple work pieces which are similar to each other, and are clamped on a work piece carrier. Such work pieces can be made in small, intermediate or large series in computer numerically controlled (CNC) work centers, or can be worked on with multi-spindle special machines. The effective operating time of such CNC operating centers and special machines should be effectively increased, so that the cost of machining, per work piece, drops. At the same time, costs can be saved by use of work pieces which will form components of other machines, and which are as much as possible already in the form of elements ready to be assembled, for example being injection molded, or pressed. Such work pieces should require only minimum fine working involving material removal. That means that such work pieces frequently have to be worked on at only a few regions, so that the individual work times for working on the work pieces are relatively short. However, other time periods then become even more important in such working. These auxiliary or lateral time periods are those required for supplying the work pieces, clamping them, re-clamping them in a different position, if necessary, and removing the work pieces. These auxiliary time periods form a cost factor which becomes increasingly important as the initial preparation of the work pieces themselves becomes more accurate requiring little re-working.

CNC operating centers and special machinery are highly developed; this permits to fulfil the highest requirements of quality and accuracy. To insure that the precision possible by the machines can also reflect itself in the work piece itself, it is necessary that the work piece is positively fixed on the work piece carrier, and reliably clamped thereon in a fixed position. Frequently it is possible to meet the highest requirements and quality only by fine machining the work pieces once they have been clamped so that small errors which might arise due to re-positioning and re-clamping the work pieces are avoided.

Various different work clamping arrangements for CNC operating centers and special machinery are known in engineering practice; these clamping arrangements are suitable for small, intermediate or large series operations and permit work pieces to be commonly clamped and worked on. The work pieces are supplied in a predetermined quantity and placed in a predetermined arrangement. In one type of such a multiple clamping arrangement, a work piece carrier in the form of a beam of generally square cross-section is provided. The beam is rotatable about its longitudinal axis and securely retained in bearing blocks at both ends thereof. On one side it is coupled to a rotary indexing table. Each of the four sides of the work piece carrier have a clamping surface for the reception of, for example, four work pieces located in a row. The rotatable table permits indexing the work piece carrier about its longitudinal axis over a predetermined angle to bring the work pieces, clamped in rows on the clamping surfaces in suitable receptors, to a desired operating position where they can be worked on. In the operating position, the work pieces are in properly aligned position in relation to the respective operating spindles and tools. These clamping arrangements permit, however, only working of the work pieces on three sides. Work pieces which require working thereon on more than three sides have to be re-positioned and re-clamped for, for example, finishing work in a further subsequently connected CNC operating center. Re-clamping of the work pieces is time-consuming and, as mentioned, introduces the danger of errors in the positions of the work pieces after re-clamping.

Multiple clamping arrangements have also been proposed in order to permit operating on four or five sides of work pieces in one clamping operation. An elongated work piece carrier has up to four round indexing tables located in a row adjacent each other. The work piece carrier itself is rotatable about its longitudinal axis and suitably supported for such rotation. The indexing tables receive the work pieces from a loading and unloading station. They are then rotated into a working position, so that they can be worked on at a working station and, after termination of the work on the work pieces, they are rotated back for reception by the loading/unloading station. The indexing tables are coupled to a common drive system which permits placement of work pieces, clamped on the tables, at the actual operating station into the respectively required different positions with respect to the tools themselves. These clamping arrangements permit, however, only simultaneous clamping of a highly limited number of work pieces. The indexing range of the tables is usually limited to less than 300 circular degrees. These arrangements also require, usually, an individual drive and additional axial controls so that they cannot be combined with existing CNC operating centers or special machinery without substantial rebuilding and reconstruction. Efficient, economic working on the work pieces is possible only to a limited extent. For this reason, working on more than three sides of the work pieces is usually not done and it was preferred to return to three-sided work pieces in order to be able to clamp a larger number of work pieces simultaneously. The disadvantage thereof, that the work pieces must be re-positioned and re-clamped at least once, is accepted in these clamping arrangements which work with work piece carriers in beam shaped, or cube shaped, work piece carriers and clamping arrangements, as above briefly described.

The Invention

It is an object to provide a multiple clamping arrangement which permits working on a larger number of work piece on more than three sides in one clamping step, and which is simple and reliable in construction and use. The clamping arrangement should further be compatible for use with existing CNC operating centers and special machinery without extensive reconstruction.

Briefly, the multiple clamping arrangement is provided on a polygonal elongated work piece carrier which, at least on one side, is supported in a fixed bearing, to be rotatable about its longitudinal axis. At least two—typically four— clamping surfaces are provided, extending parallel to the longitudinal axis of the work piece carrier. Each one of the clamping surfaces is provided with at least two rotatable or indexable work piece holding tables, located in a row next to each other in such a manner that the axes of rotation of all the tables on any one of the clamping surfaces are in the same plane which is parallel to the longitudinal axis of the work piece carrier, or which includes this longitudinal axis. This permits simultaneously working on a relatively large number of work pieces at the operating stations at the same time. The quantity and spacial position thereof is determined by the number of the clamping surfaces of the work piece carrier. The rotatable or indexable tables permit aligning the work pieces on each clamping surface at the respective operating stations in the same direction, as required by the tools of the respective operating station, so that they are in the appropriate relative position with respect thereto. During working, the work pieces, just as the work piece carrier, are precisely positioned and fixed in the position with respect to the various tools. The work piece carrier and, hence, the work pieces themselves, are always indexed in the same direction of rotation from work station to work station. Each clamping surface passes a loading station and unloading station, respectively. Thus, very short auxiliary handling, or loading and unloading periods result. Working in one clamping position on all sides up to the engagement surface of the work piece on the surface is possible.

All the tables of the multiple clamping arrangement are positively coupled together by gearing and to a common drive source. This, on the one hand, insures that all work pieces will always have the same spacial alignment and, further, reduces the constructional complexity to generate the rotary movement of the indexable tables to a minimum. The gears or gear means, in dependence on a rotational movement of the work piece carrier about its longitudinal axis, relative to the fixed bearings, are so driven that all index tables are rotated about their respective axes about a rotary angle which, at least approximately, has a fixed relationship to the rotational angle about which the work piece carrier rotates about its longitudinal axis. This indexing relocates the clamping surfaces, together with the work pieces from one to the respective subsequent operating station.

In accordance with a preferred embodiment of the invention, the common drive source is a central drive gear, with which gears are in engagement. The drive gear can be rotated, or fixed in rotated position relative to the bearings supporting the work piece carrier. The work piece carrier is rotatable with respect to the drive gear. The drive gear, which is rotatably supported, can be fixed in specific rotary positions by a controlled locking device—a highly suitable arrangement.

An interrogation system simply and reliably insures that operation on the work pieces is started only when, after a switching movement or rotary movement of the work piece carrier, all rotary tables are precisely positioned and locked by their locking arrangements. Suitably, all rotary tables are associated with a central interrogation arrangement through which the locked position of all the rotary tables is interrogated once for all. Use of an interrogation rod provides a particularly reliable and space-saving arrangement. The rod, which is longitudinally slidable, cooperates with the interrogation elements, associated with each of the rotary tables.

The multiple clamping arrangement, in dependence on the type of the multi-station operating machine or operating center, can be used in a vertical or horizontal operating position, that is, the longitudinal axis of the work piece carrier can be horizontal or vertical.

BRIEF DESCRIPTION OF THE DRAWINGS

FIG. 1 is a perspective view of an example of the multiple clamping device;

FIG. 2 is a perspective view of the clamping device of FIG. 1 in which some of the rotary tables have been removed, to illustrate a portion of the mechanism;

Various parts in the Figures are illustrated with different kinds of hatching for clarity; the choice of the hatching is not to be considered as indicative of a specific material from which the pieces are made.

DETAILED DESCRIPTION OF THE INVENTION

Figure 4:
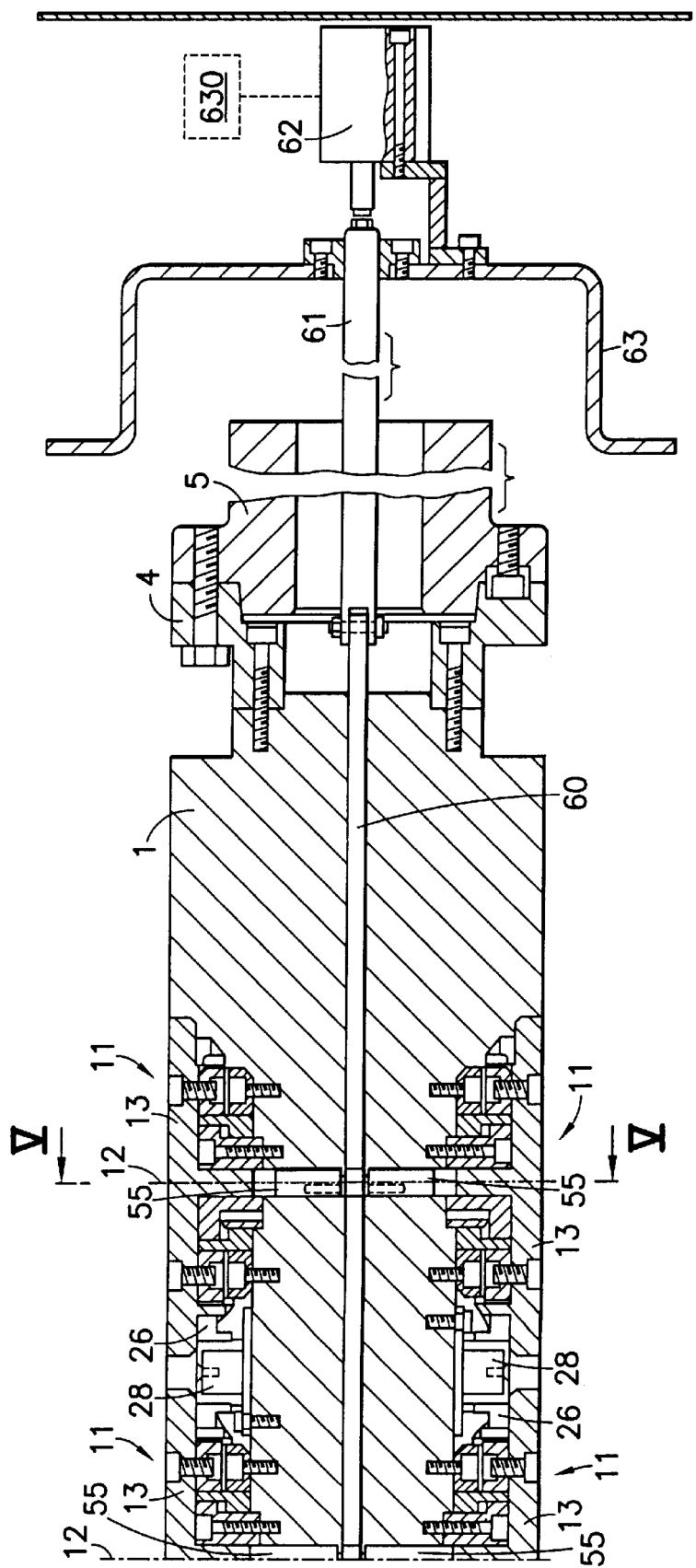
FIG. 4 is a partial side view in axial section, and illustrating the interrogation device, to yet another scale.

Referring first to FIGS. 1 and 2, the clamping device in accordance with the invention has an elongated, longitudinal, beam-like work piece carrier 1. As shown in FIGS. 1 and 2, the work piece carrier has cross-sections of square shape, so that four sides clamping surfaces 2 are formed which, respectively, define pairs of such surfaces parallel to each other. The work piece carrier 1 may have various polygonal cross-sections or shapes; for example, it may be a square, an isosceles triangle, a hexagon, or another configuration. It has a connecting flange 4, screw connected thereto and coaxial to its longitudinal central axis 3. As best seen in FIG. 4, the flange is connected to a reception stub 5 of a CNC working center which is not further shown and may be of any standard construction. The reception stub 5 receives controlled rotary movement from an indexing device of the CNC work center. This rotary, or switched in rotary or indexing movement, is about longitudinal central axis 3. It permits rotating the work piece carrier 1 about its longitudinal axis 3 (FIG. 2) in such a manner that the clamping surfaces 2 will be aligned with respect to operating tools of respective working stations, located ring-shaped about a multiple clamping device. This is well known in connection with CNC operating systems and centers.

The work piece carrier 1 is screw connected with a coaxial reception flange 500 (see FIG. 3) which securely couples the work piece carrier 1 with a coaxial cylindrical bearing part 7, to rotate therewith. The bearing part 7 is rotatably supported over a roller bearing 8 and a bearing bushing 10 with a fixed bearing support 9, forming a portion of the CNC working center. The reception stub 5 (FIG. 4) and the bearing support 9 (FIG. 3) of the CNC operating center form fixed bearing elements in which the work piece carrier 1 is rotatably secured, for rotation about its longitudinal axis over 360°. The longitudinal axis 3 may be horizontally or vertically aligned, in dependence on the type and construction of the CNC operating center.

Figure 5:
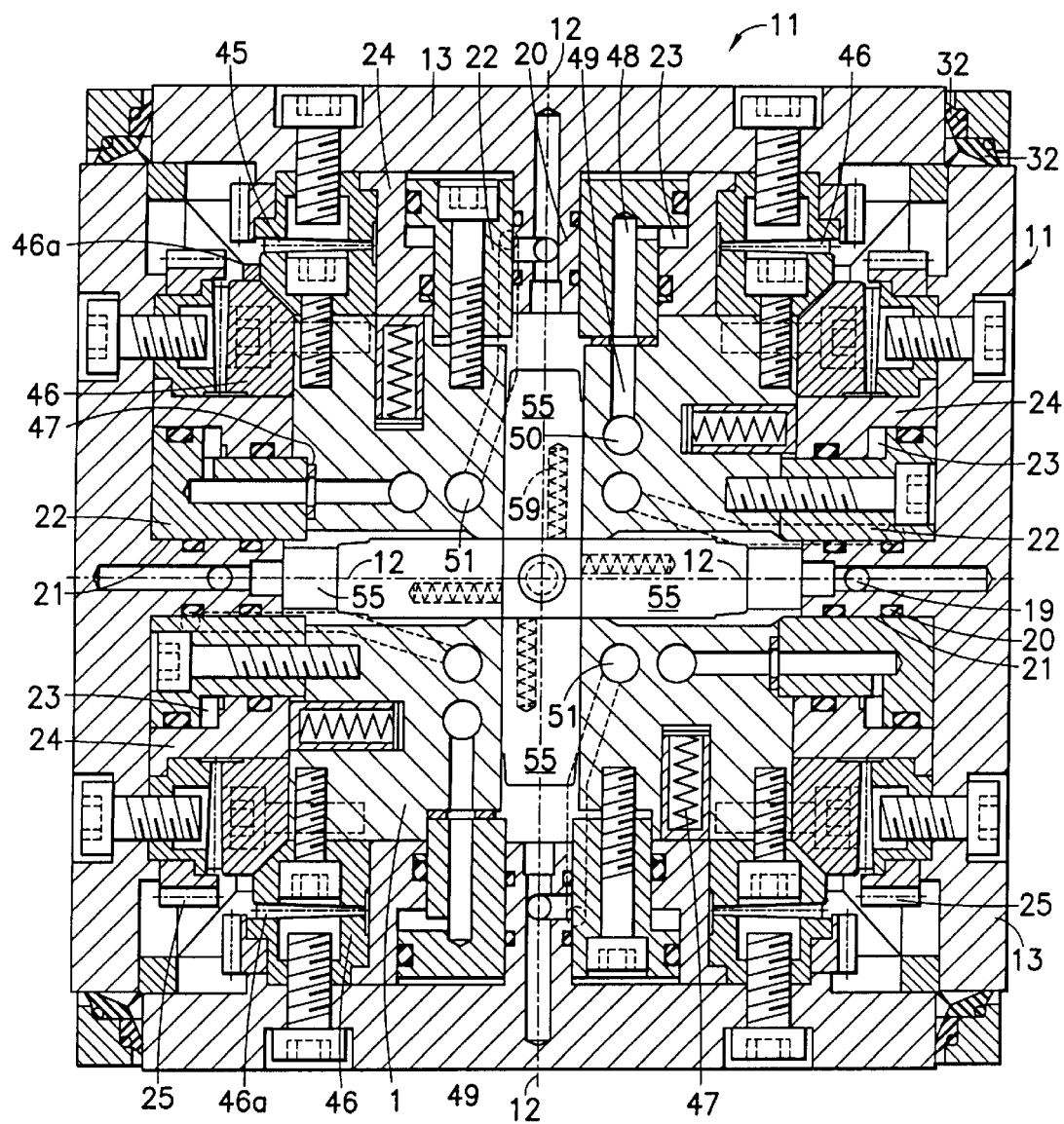
FIG. 5 is a side view of a section taken along line V—V of FIG. 4.

Twenty rotary or indexable tables 11 are located on the work piece carrier 1 in the example shown. Each one of the rotary tables 11 is rotatable about a respective axis 12 (FIG. 5). The rotary tables 11 have a disk-like reception dish 13, and each is designed to receive the respective work piece on which work is to be done, for example, as indicated highly schematically at 14 in FIG. 1. A hydraulic clamping device 15 (FIG. 6) is provided to clamp the respective work piece 14. It has a clamping arm 17 which is rotatable about an axis 16, secured to the respective table 13. The clamping lever 17 can be tilted or pivoted by a hydraulic cylinder 18. Hydraulic pressure ducts 19 (FIG. 5) supply hydraulic pressure fluid to the hydraulic cylinders 18. Details of the supply of pressurized hydraulic fluid will be described below.

Figure 3:
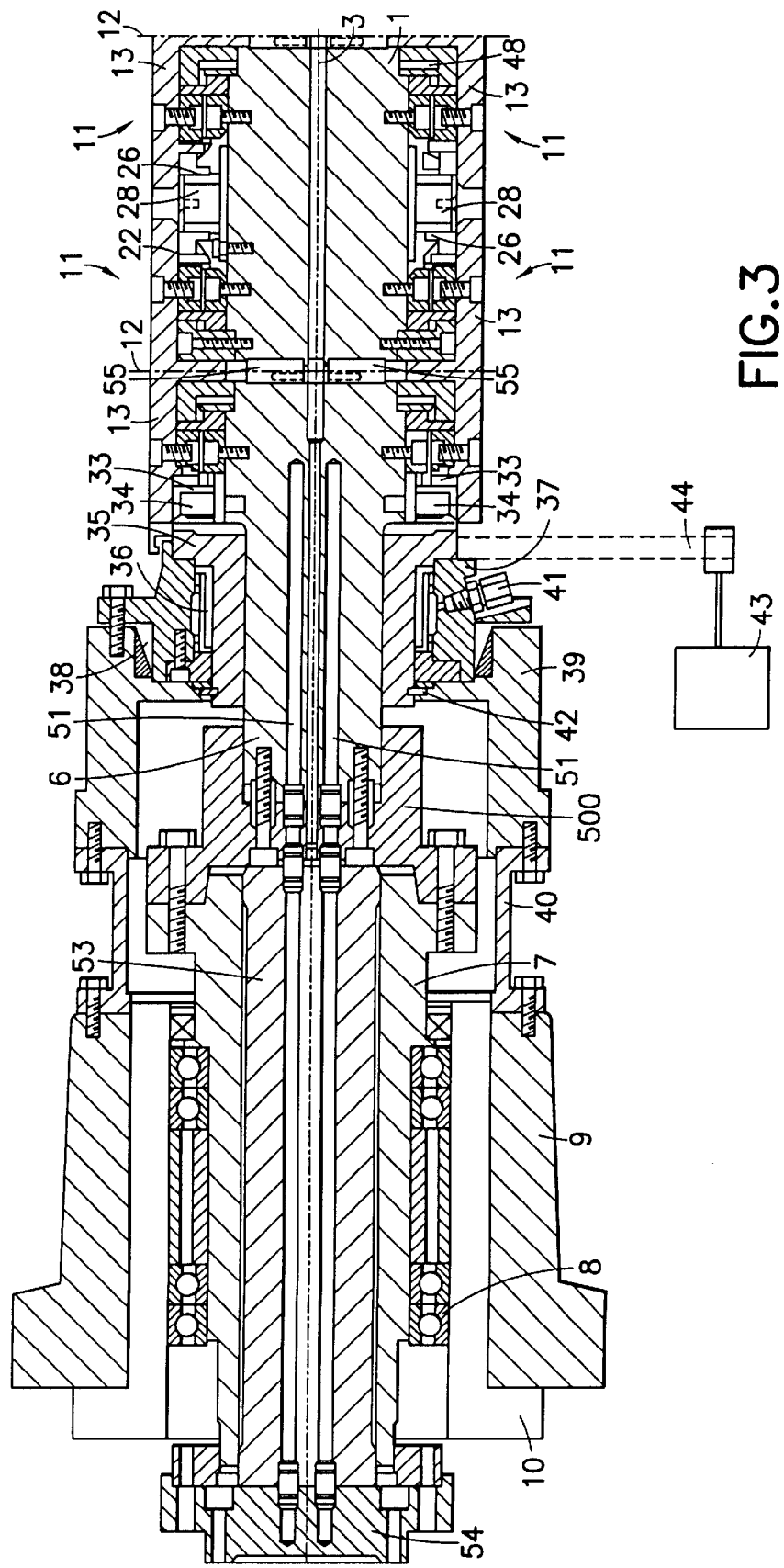
FIG. 3 is a partial side view in axial longitudinal section illustrating the drive arrangement, to a different scale of FIG. 1.

Each of the clamping surfaces 2 of the work piece carrier 1 carries five rotary tables 11, located in a row in equal distances from each other. The rotary axes of the tables 11, as best seen in FIGS. 3 and 4, are in a common plane which, in FIGS. 3 and 4, is the plane of the drawing, and which also intersects the longitudinal axis 3 of the workpiece carrier 1. As seen in FIGS. 1 and 5, four rotary tables of the four reception surfaces 2 are in a common cross-sectional plane, which is extends at right angles to the longitudinal axis 3 of the work piece carrier 1.

The reception disks 13 of each of the rotary tables 11 are retained in a suitable longitudinal bore 21 of a piston 22 located in the work piece carrier 1 and sealingly screwed therein. The coaxial bearing pin 20, formed on the respective rotary table 11, as best seen in FIG. 5, thus can be rotated in the bore 21 about 360°. The piston 22 (FIG. 5) is surrounded by a slide bushing 24, sealed against the piston, to define a cylindrical chamber 23. The slide bushing 24, thus, also functions as a cylinder. The slide bushing 24, at its outer circumference, is formed with a spur gear 25. It can also be formed as a gear ring, for example integral with the bushing 24. The slide bushing 24 is screw-connected to the respective disk or dish 13.

Figure 6:
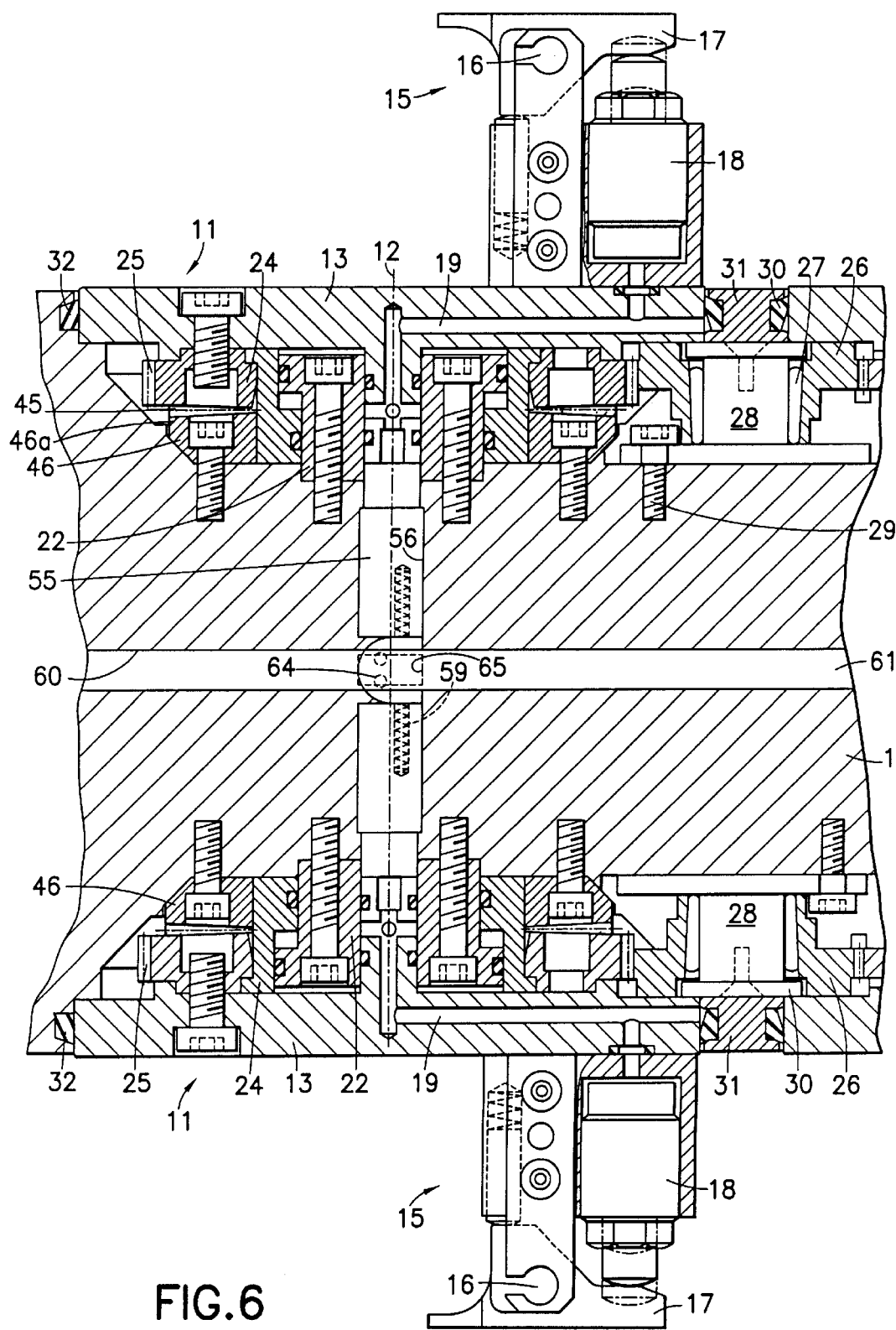
FIG. 6 is a side view of the device of FIG. 1, in axial longitudinal section and illustrating two oppositely located rotary or indexable tables, to yet another scale, and omitting elements not necessary for an understanding of the invention.

An intermediate gear 26 is located between adjacent rotary tables 11 of a roll, see FIGS. 2 and 6. The intermediate gear 26 is rotatably supported on the cylindrical bearing bolt 28 via a pin or needle bearing 27. The bearing bolt 28 is screw-connected to the work piece carrier 1, as seen at 29. A stop plate 30, screw-connected on the bearing bolt 28, retains the gear 26 in axial direction. The space between two adjacent reception disks 13 of a row of indexable table 11 is closed off by a cover element 31. Circular lip seals 32 seal the tables 11 with respect to the work piece carrier, to prevent ingress of contamination, cutting chips and the like, in the support system for the tables 11 and the reception disks 13 thereof.

The spur gears 25, coupled to the rotary tables 11 and the reception disks 13 over the slide bushings 24, in which the intermediate gears 26 engage on respectively two adjacent rotary tables 11, form a drive means or drive source which insures that all reception disks 13 of a row of rotary tables 11 carry out a positively coupled synchronized uniform and equal rotary movement about their respective rotary axes 12.

The spur gear 25 of the last one of the reception disks 13, and adjacent the bearing support 5 (FIG. 6) of each row of rotary tables 11 engages with a connecting gear 33 (FIG. 3) which is freely rotatable on a bearing pin 34 of the work piece carrier 1. The connecting gears 33 of the rotary tables 11 located on the four reception surfaces 2 are in engagement with a common coaxial drive gear 35 which is formed as an end gear and is freely rotatable on the cylindrical bearing pin 6 of the work piece carrier 1. The common drive gear 35 is surrounded by a hydraulically expandable clamping sleeve 36 which is located in a cylindrical clamping sleeve carrier 37. The clamping ring 37 is coupled by a clamping ring 38 to a holding flange 39 for rotary movement therewith. The holding flange 39 is screw-connected on a sleeve-like intermediate element 40 with the bearing support 9, as shown schematically.

The clamping sleeve 36, controlled over a hydraulic connection 41, can selectively be subjected to a pressure medium. It permits to fix the common drive gear 35 secure against rotation with respect to the bearing support 9 and, hence, the machine frame of the CNC operating system or station. A snap ring 42 retains the drive gear 35 against axial movement, so that the clamping ring 38 permits axially positioning the drive gear 35 over the clamping sleeve carrier 37 in such a manner that the gear play or slack of the four connecting gears 33 are reduced to a minimum.

Alternatively, and as schematically shown in FIG. 3, the drive gear can receive its own drive arrangement, for example in the form of a control unit of the CNC operating station or system, which drives a controlled electric gear motor 43, for example over a gear belt drive 44. The electric gear motor 43 is secured to the frame of the machine and permits the drive gear 35 to be rotated relative to the work piece carrier 1, and thus rotate all rotary tables 11 at the same time with the same rotary speed. This permits rotation of the work pieces 14 during work being carried thereon and, thus, generates a fifth operating axis. It is also possible, thereby, to rotate the drive gear 35 and, with it, all the rotary tables 11 together, in dependence of a working program, over predetermined angles if such is necessary or desirable, for working on the specific work pieces.

FIGS. 5 and 6 best illustrate the embodiment of the multiple clamping device in which each of the rotary tables 11 has a locking arrangement by which, during working on the clamped work pieces 14, the respective rotary tables 11 are locked in a predetermined angle or direction as required, with respect to the work piece carrier 1. Thus, the work pieces 14 are locked in position in specific angular adjustment with respect to the work piece carrier 1. The locking device is formed by an interengaging arrangement.

The reception disks 13 of each one of the rotary tables 11 are not only rotatable, but also movable in an axially limited distance. Each one of the tables 11 has its bearing pin 20 positioned in the associated bearing bore 21 of the piston 22 screw-connected in the work piece carrier 1. The slide bushing 24 has a ring surface facing the work piece carrier 1. This ring surface is formed with serrations, or a chamfered-tooth gear ring 45, which can interlock with a matching serration or chamfered-tooth gear ring 46a of a gear ring 46 which is coaxial to the slide bushing 24 and forms a partial disk. The gear ring 46 is screw-connected to the work piece carrier 1. The slide bushing 24, which is fixedly secured to the reception disk 13, is axially biased by pressure springs 47, uniformly distributed about the axis of rotation 12, in such a manner that the springs 47 have the tendency to lift the slide bushing 24 with its serrations 45 out of the engaging serrations 46a of the gear ring 46. A cylindrical space 23 is formed between the slide bushing 24 and the piston 22. The cylindrical space 23 is connected to a duct 48 in the piston 22 and a corresponding duct 49 which, in turn, connects to a pressure medium supply duct 50 extending parallel to the longitudinal axis 3 in the work piece carrier 1. Each one of the tables 11 has its own system, so that four pressure medium supply ducts 50 for the four rows of tables 11 extend parallel to pressure medium supply ducts 51 likewise located in the work piece carrier for hydraulic cylinders 18 (FIG. 6) located on the tables 11 and the, hence, the disks 13. A coupling element 53 (FIG. 3) is connected to a pressure distributor 54 seated on the bearing part 7, and hydraulically connected to the respective pressure medium supply ducts 50, 51. The rotary pressure distributor 54 forms a portion of the CNC operating center. Pressure medium under controlled condition can be supplied to the ducts 50, 51 in the work piece carrier, independently of the rotary position of the work piece carrier 1.

Rotation of the Work Piece Holder Tables 11

When the cylindrical spaces 23 of the rotary tables 11—of at least one row of rotary tables—are made pressure-free, the springs 47 lift the disks 13, so that the serrations 45, 46a disengage and the positional fixed locking of the disks is released. The spur gears 25 of the slide sleeves 24 remain in engagement, however, with the intermediate gears 26. By a relative rotation of the work piece carrier 1 with respect to the drive gear 35 which is restrained against rotation by the clamping sleeve 36, a uniform synchronous rotation of all the tables 11 can be obtained about their respective axes 12. The angle of rotation of each one of the tables 11 is in a fixed relationship to the angle of the relative rotation of the work piece carrier 1 with respect to the drive gear 35, determined by the transmission ratio.

As soon as the clamping surfaces 2 of the work piece carrier 1 are in the appropriate angular position for the respective specific working station, cylinder chambers 23 of the rotary or indexable tables 11 are again subjected to pressure fluid, which causes the slide sleeves 24 together with the receptions disks 13 to move inwardly, for example, downwardly. This causes the beveled tooth gears or serrations 45, 46a to engage, and finish in matching engagement, and thus lock the respective rotary table 11 in its appropriate fixed position with respect to the work piece carrier 1. Since, as is well known, the flanks of the gears of the serration are beveled, or chamfered, the serrations or gears 45, 46a are self-centering. It is thus only necessary that the gear drive means formed by the drive gear 35 and the connecting gears 33 as well as the intermediate gears 26 and the spur gear 25 rotate the rotary tables 11 in the vicinity of the respective commanded position, in such a manner that the serrations or beveled gear 45, 46a can engage, thereby locking the reception disks 13 in the locking position, as above described. The angular precise positioning of the rotary tables 11 and, hence, of the work pieces 14 thereon are effected by the serrations or beveled gear 45, 46a.

Other arrangements for locking could be used instead of the serrations 45, 46a, which have interengaging locking elements which, preferably, are also self-centering. Examples therefor are indexable bolts, wedges, prisms and the like; it is also possible to journal the reception disks 13 axially immovably on the work piece carrier 1 and, instead, make the associated gear rings 46 controllably axially movable.

It is necessary to insure that, after each indexing or switching step of the work piece carrier 1, that is, after moving the rotary tables 11 in their respective working stations of the CNC operating center, that the rotary tables 11 and the work pieces 14 clamped thereon are positively positioned with respect to the work piece carrier 1 in their respective designed or desired position, and locked in place, before operating tools of the CNC operating system start with working on the work pieces and, thereby, apply working forces on the work pieces 14. The clamping device thus has an interrogation arrangement which determines whether all the indexable tables 11 are positively locked by the serrations or beveled gears 45, 46a after the respective cylinder spaces 23 have been subjected to pressure fluid.

Figure 8:
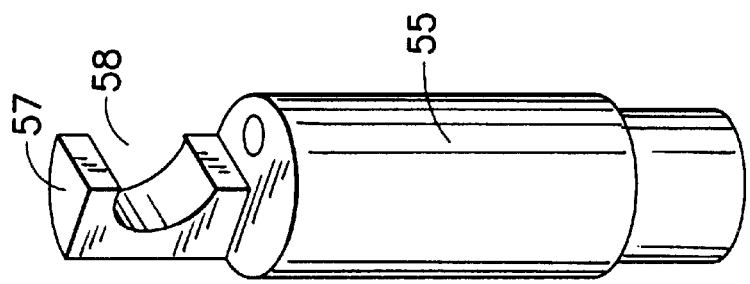
FIG. 8 is a perspective view of an interrogation element shown in FIG. 7, in greater detail.
Figure 7:
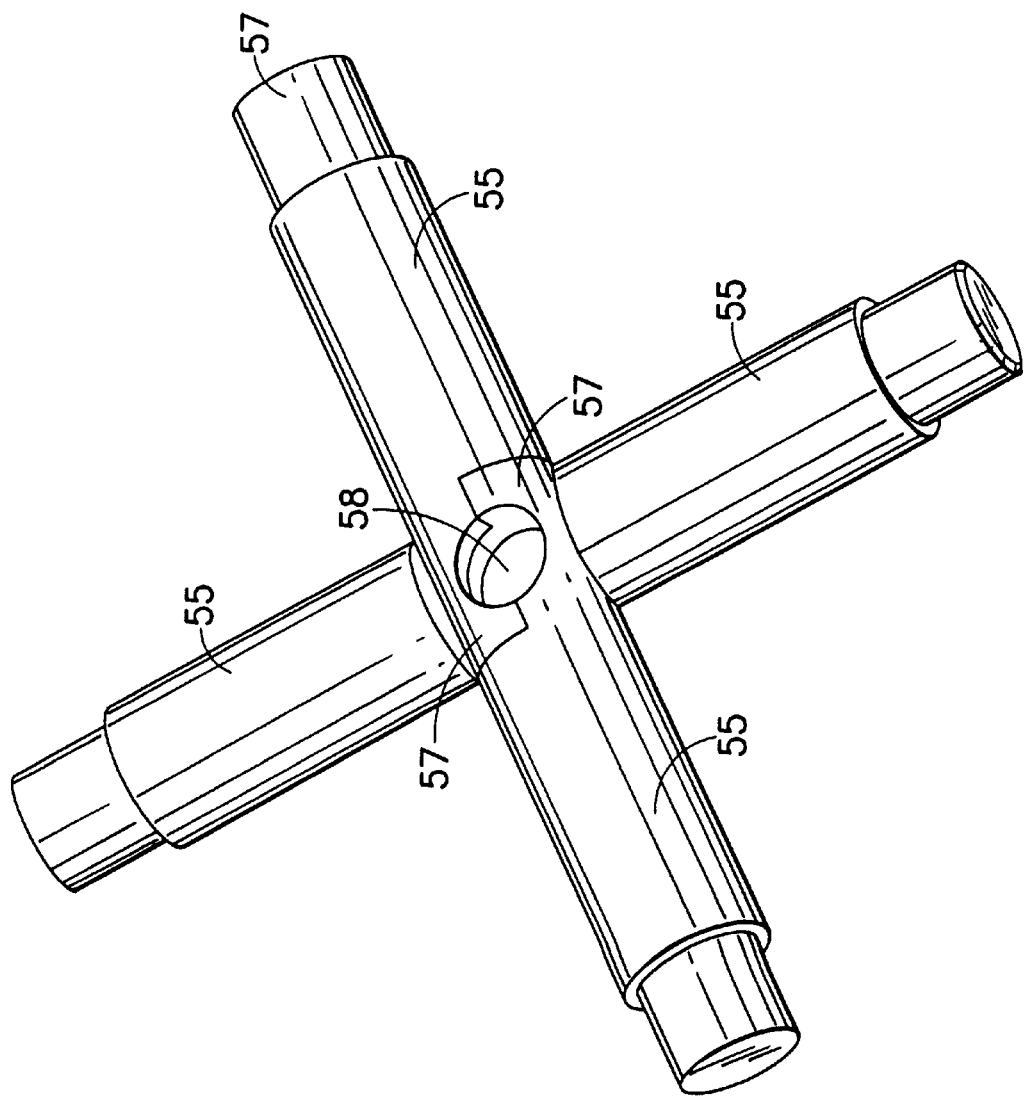
FIG. 7 is a perspective view, to another scale, of the interrogation elements for four rotary tables on four carrier surfaces.

In accordance with a feature of the invention, the interrogation elements are constructed in the form of cylindrical interrogation bolts or sliders 55 (see FIGS. 5, 6, 7) which are longitudinally slidably journalled in bores 56 (FIG. 6) of the work piece carrier 1 coaxial to the bearing bore 21 of the respective rotary table 11. Each interrogation slider 55 engages with its end face on the bearing bolt 20 of the associated reception disk 13 and, thus, senses the axial position thereof with respect to the work piece carrier 1. The rotary tables 11 of the four rows of rotary tables—as above described—are in respective parallel cross planes which intersect the longitudinal axis 3 of the work piece carrier 1 at right angles. Thus, four interrogation sliders 55 are provided, in cross-like arrangement in such a cross plane, as best seen in FIG. 7. Each one of the sliders 55 has a specially shaped lock portion 57 (FIGS. 7, 8) which extends only up to the respective longitudinal cross plane of the interrogation slider and takes up only a quadrant of the circular end face thereof. The portion 57 is formed with a semi-cylindrical recess 58 (see FIG. 8) which extends at a right angle to the longitudinal central axis of the interrogation slider 55.

If the four reception disks 13 which, with their rotation axes 12 are in a common cross plane, are all properly in dropped, work-ready position on the work piece carrier 1, and locked thereto, the four position sensing sliders 55 (FIG. 7) are so pushed together that the four semi-cylindrical recesses 58 match to form a continuous cylindrical bore, which is located at the intersection of the diagonals of the square cross-sectional shape of the work piece carrier 1. If, however, one of the rotary tables 11 has its serrations or beveled gear teeth 45, 46a not, or not entirely in engagement, the respective interrogation slider 55 will be axially shifted with respect to the other three interrogation sliders, so that the four half-cylindrical recesses 58 will not match and join together to form a complete through bore; rather, the cross-section shown in FIG. 7 is partially blocked.

Pressure springs 59 (FIGS. 5, 6) hold the sliders 55 under tension in end engagement on the bearing pins 20 of the reception disks 13. The springs 59 are located on respectively opposite sliders 55.

An interrogation rod 61 is longitudinally slidably retained in a bore 60 which is coaxial to the longitudinal central axis 3 of the work piece carrier 1. The interrogation rod 61 extends (see FIG. 4) from the side of the connecting flange 4 out of the work piece carrier 1. It is carried through the reception bolt 5 and coupled to an operating cylinder 62. Cylinder 62 is seated on a fixed holder 63, for example coupled to the frame of the machine. The operating cylinder 62 can axially position the interrogation rod 61 with respect to the work piece carrier 1. The operating cylinder 62 has a position sensor 630, only shown schematically, associated therewith which, in dependence on the axial position of the interrogation rod 61, provides a monitoring signal to the control of the CNC operating center.

The interrogation rod 61 is carried through the recesses 58 of all the interrogation sliders 55. At each of the crossing points of the respectively four interrogation sliders 55, it is formed with a portion 64 (see FIG. 6) of reduced diameter, the axial length of which corresponds approximately to the diameter of a bore 56. The decrease in diameter in section 64 is so selected in comparison to the diameter of the semi-cylindrical recesses 58 in the interrogation sliders 55 that the axial movement of the reception disks 13, necessary for unlocking the serrations or bevel teeth gears 45, 46a permits the rotary tables 11 to carry out their required axial movement. When, upon subsequent re-locking, all four interrogation sliders 55 are again brought in the final position of FIG. 7 at the various crossover points, then the half cylindrical recesses 58 of the four cooperating sliders 55 complete the bore through which the interrogation rod 61 can carry out an axial interrogation by the operating cylinder 62—with respect to FIG. 4 to the left—with its unrelieved portion; this unrelieved portion of the rod 61 corresponds to about the diameter of through bore 56. Sensor 630 (FIG. 4) then supplies a suitable signal that all the rotary tables 11 are properly locked. If, however, one of the rotary tables should have jammed, and not reached its proper locking position, then the cross bore formed by the three other associated sliders 55 will be partially blocked. The interrogation rod 61 has a shoulder 65 (FIG. 6) which delimits the portion of reduced diameter 64. The shoulder 65 then runs on the specially shaped end portion 57 of the respective interrogation slider 55 associated with the not properly locked rotary table 11, and cannot be moved further. Sensor 630 signals the presence of an error position to the control unit of the CNC operating center.

Of course, basically, other interrogation systems could be used, operating with electrical, pneumatic or hydraulic interrogation elements and sensor which are associated with the respective rotary tables 11 or rows, or groups of the tables 11.

The electric drive motor 43 (FIG. 3) could be replaced by a different drive source. The drive gear 35, for example, could be coupled with a coaxially located hollow shaft of a circular index table, which drives the drive gear 35. The embodiment shown is characterized by a particularly simple and space-saving construction. The indexable table would replace parts 36 through 40 of FIG. 3 and is coupled to the bearing reception portion of bearing 9.

The embodiment described has small spacial requirements for the common drive source of the rotary indexing tables 11 and permits a particularly simple construction of the clamping arrangement in combination with existing CNC operating centers. To index the work piece carrier 1 about an angular value for indexing from working station to working station about its longitudinal axis, it is only necessary to rotate a circular table coupled to the work piece carrier, when the drive gear 35 is restrained in spatially the rotary locked position. Upon rotary movement of the work piece carrier, all of the indexable tables 11 are rotated simultaneously about their respective axes of rotation 12 about the same predetermined angle due to the gears which are in engagement with the drive gear. The angular rotation depends on the transmission ratio between the gear ring and the main drive gear. The interengaging gears are so constructed that they directly take over the precise positioning of the rotary tables 11 at the respective working station, due to the serrations 45, 46a. The drive gears, in suitable construction, for example with auxiliary gear drives, worm gears, or the like, permit high positional accuracy of the work pieces during working thereon.

If the drive gear is rotatably positioned and, as noted, is fixed against rotation by a controlled locking arrangement, the possibility arises to release the drive gear as soon as the work piece carrier has finished its indexing movement and is locked. This permits rotating a rotary table about a predetermined angular position, for example by a rotation arrangement on the CNC operating center and present thereon. Thus, all rotary tables will be subjected to the same angular rotation so that all rotary tables 11 will be placed and arrested in the new angular position. The locking arrangement of the drive gear can then, again, be locked against rotation.

The drive gear can also have its own drive arrangement associated therewith so that, upon drive thereof, all rotary tables 11 are rotated with respect to the work piece carrier. This permits rotating the work pieces at certain operating processes or steps about the rotary axes of the respective tables 11, and provides a further operating axis for working on the work pieces. The separate drive arrangement can also be used to change the rotary tables 11 when the work piece carrier 1 is fixed in position. This change will be about a predetermined angle so that, for respectively sequentially spatially offset bores, or the like, can be carried out on the work pieces.

Each rotary table 11 preferably has the interengaging locking system formed by the serrations 45, 46a to lock the respective rotary tables 11 to the work piece carrier in fixed predetermined angular position with respect to the work piece carrier. This has the advantage that positioning of the rotary tables will be independent of some play in the overall gear ring. This permits the gear ring to be constructed particularly simply, and also makes it possible to use gear belts and the like within the transmission or gear ring which, in accordance with their construction, have some tolerances. The gear drives and gear ring need to bring the rotary tables 11 only in the approximate location of their respectively required command position. Precise positioning, with respect to the work piece carrier 1, is then carried out by suitable locking elements in combination with the interengaging locking arrangement by the serrations 45, 46a. Using serrations or inclined teeth gearing is particularly simple and effective. It is only necessary to cause, upon each rotation of a rotary table, a relative axial movement which brings the respective gear or serration elements 45, 46a in and out of engagement. In the embodiment described, which has a rotatably journalled and controlled locking arrangement for a common drive gear, which can be locked in a specific angular position, a circular indexing table of the CNC operating center can switch the work piece carrier 1—with the locking arrangement of the respective rotary tables 11 released—and the drive gear fixed in position, to move all rotary tables 11 about their respective axes in the same amount. After locking the work piece carrier, the drive gear can be released so that the now operated locking arrangements can move the respective rotary tables 11 independent of the drive gear into precise rotary angled position, and lock them with the serrations 45, 46a in a highly precise angular position.

Various changes and modifications may be made within the scope of the inventive concept; some sub-constructions, equivalent to those described in the preferred embodiment, have been indicated in the specification.

What is claimed is:

1. A multiple clamping device for work pieces (14) having a plurality of working surfaces to be machined, comprising:
   an elongated work piece carrier (1) having a polygonal cross-section, defining a longitudinal axis (3) and being retained, at least at one end, in bearing means (5, 9) for rotation about said longitudinal axis, and further having at least two clamping surface (2) extending parallel to said longitudinal axis (3);
   a plurality of rotatable work piece holding tables (11) rotatable about respective axes of rotation (12) relative to the work piece carrier (1), located adjacent each other in rows of at least two said tables on each of said clamping surfaces (2),
   wherein said rows are in common planes parallel to, or containing said longitudinal axis (3), and wherein said axes of rotation (12) of said tables are parallel to each other, wherein said work piece holding tables (11) are arrestable in predetermined angular positions of rotation about their respective axes of rotation (12) relative to the work piece carrier (1);

a drive source (35, 43) providing rotational power to said work piece holding tables (11);

interengaging, positive drive means (25, 26, 33) positively coupling said holding tables (11) and said drive source (35, 43);

wherein said drive means (25, 26, 33) for said holding tables (11), in dependence on a rotational movement of the work piece carrier (1) about its longitudinal axis (3) relative to said bearing means (5, 9) are so rotatable that all holding tables (11) are rotated about their respective axes of rotation (12) about an angle which has at least approximately a fixed relation to the angle of rotational movement of the work piece carrier (1) about its longitudinal axis (3).

2. The device of claim 1, wherein said drive source (35, 43) comprises a central drive gear (35) in driving engagement with said drive means (25, 26, 33), wherein said central drive gear (35) can be angularly fixed in position with respect to said bearing means (5, 9); and wherein said work piece carrier (1) is rotatably journalled relative to the drive gear (35).

3. The device of claim 2, wherein a controlled gear arresting or positioning device (36) is provided to arrest said drive gear (35) in a predetermined angular position, secure against rotation.

4. The device of claim 2, further including a drive means (43) coupled to said drive gear (35) for rotating said drive gear relative to the work piece carrier, thereby rotating all said work piece holding tables (11).

5. The device of claim 3, further including a drive means (43) coupled to said drive gear (35) for rotating said drive gear relative to the work piece carrier, thereby rotating all said work piece holding tables (11).

6. The device of claim 1, further comprising a positive interengaging locking system (45, 46a) associated with each work piece holding table (11) and located at least in part on said work piece carrier (1) for positively locking respective work piece holding tables (11) in precise, predetermined rotary angular positions relative to the work piece carrier (1).

7. The device of claim 6, wherein said locking system comprises a serration, or beveled tooth gear ring (45, 46a) system having a part which is axially movable through a limited distance and located on said work piece carrier (1).

8. The device of claim 6, further including an interrogation system (55, 61) coupled to all said work piece holding tables (11) to interrogate the state of locking of all said tables in said precise angular positions on the work piece carrier.

9. The device of claim 8, wherein said interrogation system (55, 61) comprises a longitudinally slidable rod (61) longitudinally slidably retained in said work piece carrier; and interrogation elements (55) on each one of said work piece holding tables (11) operatively coupled to said longitudinal rod (61), wherein the position of said interrogation elements depends on whether the respective work piece holding table (11) to which it is coupled is locked in proper angular position, or not.

10. The device of claim 9, wherein the interrogation elements (55) each comprise a shaped part (57), the position of which is controlled in dependence of longitudinal movement of said work piece holding tables (11) in the direction of their axes of rotation (12); and wherein said longitudinal slidable rod (61) comprises rod portions (64) in cooperating relation to said shaped parts whereby, when said shaped parts are all in a position indicating proper locked engagement, said longitudinal slidable rod can slide to a "correct" position.

11. The device of claim 1, wherein said rotatable work piece holding tables (11) located in rows on the clamping surfaces (2) of the work piece carrier (1) have their axes of rotation (12) located in respectively spaced, parallel planes extending at a right angle with respect to the longitudinal axis (3) of the work piece carrier (1).

12. The device of claim 11, wherein said drive source (35, 43) comprises a central drive gear (35) in driving engagement with said drive means (25, 26, 33), wherein said central drive gear (35) can be angularly fixed in position with respect to said bearing means (5, 9); and wherein said work piece carrier (1) is rotatably journalled relative to the drive gear (35).

13. The device of claim 12, wherein a controlled gear arresting or positioning device (36) is provided to arrest said drive gear (35) in a predetermined angular position, secure against rotation.

14. The device of claim 13, further including a drive means (43) coupled to said drive gear (35) for rotating said drive gear relative to the work piece carrier, thereby rotating all said work piece holding tables (11).

15. The device of claim 11, further comprising a positive interengaging locking system (45, 46a) associated with each work piece holding table (11) and located at least in part on said work piece carrier (1) for positively locking respective work piece holding tables (11) in precise, predetermined rotary angular positions relative to the work piece carrier (1).

16. The device of claim 15, further including an interrogation system (55, 61) coupled to all said work piece holding tables (11) to interrogate the state of locking of all said tables in said precise angular positions on the work piece carrier.

17. The device of claim 16, wherein said interrogation system (55, 61) comprises a longitudinally slidable rod (61) longitudinally slidably retained in said work piece carrier; and interrogation elements (55) on each one of said work piece holding tables (11) operatively coupled to said longitudinal rod (61), wherein the position of said interrogation elements depends on whether the respective work piece holding table (11) to which it is coupled is locked in proper angular position, or not.

18. The combination of a multiple clamping device for work pieces (14) having a plurality of working surfaces to be machined, comprising:

an elongated work piece carrier (1) having a polygonal cross-section, defining a longitudinal axis (3) and being retained, at least at one end, in bearing means (5, 9) for rotation about its longitudinal axis, and having at least two clamping surface (2) extending parallel to said longitudinal axis;

a plurality of rotatable work piece holding tables (11) rotatable about respective axes of rotation (12) relative to said work piece carrier (1), located adjacent each other in rows of at least two tables on each of said clamping surfaces (2), wherein said rows are in common planes parallel to, or containing said longitudinal axis (3), said axes of rotation (12) of said tables (11) being parallel to each other and extending, generally, in directions perpendicular to said longitudinal axis (3);

wherein said work piece holding tables (11) are arrestable in predetermined angular positions of rotation about their respective axes of rotation (12) relative to the work piece carrier (1);

a locking system (45, 46a) coupled to each of said work piece holding tables (11) and having a part secured to said work piece carrier (1) to positively precisely determine the angular rotary position of said tables (11) relative to said work piece carrier (1) and lock said tables in said predetermined position; and an interrogation system (55, 61), coupled to all said work piece holding tables (11) to interrogate the state of locking of all said tables in said precise angular positions on the work piece carrier.

19. The device of claim 18, wherein said interrogation system (55, 61) comprises a longitudinally slidable rod (61) longitudinally slidably retained in said work piece carrier; and interrogation elements (55) on each one of said work piece holding tables (11) operatively coupled to said longitudinal rod (61), wherein the position of said interrogation elements depends on whether the respective work piece holding table (11) to which it is coupled is locked in proper angular position, or not.

20. The device of claim 19, wherein the interrogation elements (55) each comprise a shaped part (57), the position of which is controlled in dependence of longitudinal movement of said work piece holding tables (11) in the direction of their axes of rotation (12); and wherein said longitudinal slidable rod (61) comprises rod portions (64) in cooperating relation to said shaped parts whereby, when said shaped parts are all in a position indicating proper locked engagement, said longitudinal slidable rod can slide to a "correct" position.

* * * * *